US 6,646,024 B2

(12) United States Patent
Beach et al.

(10) Patent No.: US 6,646,024 B2
(45) Date of Patent: Nov. 11, 2003

(54) INK COMPOSITIONS

(75) Inventors: Bradley Leonard Beach, Lexington, KY (US); Ann P. Holloway, Lexington, KY (US); Ajay Kanubhai Suthar, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/460,959

(22) Filed: Dec. 14, 1999

(65) Prior Publication Data

US 2002/0147250 A1 Oct. 10, 2002

(51) Int. Cl.[7] .................. C09D 11/10; C08L 33/02; C08L 33/08; C08L 33/10; C08L 25/04
(52) U.S. Cl. .................. 523/160; 524/556; 524/560; 524/577
(58) Field of Search .................. 523/160, 161; 106/31.6; 524/556, 560, 577

(56) References Cited

U.S. PATENT DOCUMENTS

| | | | |
|---|---|---|---|
| 4,539,361 A | * 9/1985 | Siol et al. | 524/458 |
| 4,567,099 A | * 1/1986 | Van Gilder et al. | 428/327 |
| 4,894,397 A | * 1/1990 | Morgan et al. | 523/201 |
| 5,364,461 A | 11/1994 | Beach et al. | |
| 5,510,314 A | 4/1996 | Evans et al. | |
| 5,523,335 A | 6/1996 | Whyzmuzis et al. | |
| 5,631,309 A | 5/1997 | Yanagi et al. | |
| 5,679,724 A | 10/1997 | Sacripante et al. | |
| 5,696,182 A | * 12/1997 | Kashiwazaki et al. | 523/161 |
| 5,713,989 A | * 2/1998 | Wickramanayake et al. | 106/31.6 |
| 5,764,262 A | 6/1998 | Wu et al. | |
| 5,814,685 A | 9/1998 | Satake et al. | |
| 5,849,833 A | 12/1998 | Puschak et al. | |
| 5,851,274 A | * 12/1998 | Lin | 106/31.43 |
| 5,877,235 A | * 3/1999 | Sakuma et al. | 523/161 |
| 5,990,202 A | * 11/1999 | Nguyen et al. | 523/201 |
| 6,019,828 A | * 2/2000 | Rehman | 106/31.58 |
| 6,025,412 A | * 2/2000 | Sacripante et al. | 523/161 |

FOREIGN PATENT DOCUMENTS

| | | |
|---|---|---|
| EP | 0348565 | 1/1990 |
| EP | 0 704 303 A1 | 4/1995 |
| EP | 0 735 120 A2 | 2/1996 |
| EP | 0 851 010 A1 | 11/1997 |
| EP | 0 851 011 A2 | 11/1997 |
| EP | 0 851 012 A2 | 11/1997 |
| EP | 0 851 013 A2 | 11/1997 |
| EP | 0 851 014 A2 | 11/1997 |
| EP | 0 877 065 A1 | 11/1997 |
| EP | 0 859 037 A1 | 2/1998 |
| EP | 0 867 484 A2 | 3/1998 |
| EP | 0 869 160 A2 | 3/1998 |
| EP | 0 875 544 A1 | 4/1998 |
| EP | 0 878 522 A1 | 5/1998 |
| EP | 0 882 771 A2 | 6/1998 |
| EP | 0 887 391 A1 | 6/1998 |
| EP | 0851012 | 7/1998 |
| EP | 0900831 | 3/1999 |
| EP | 1006161 | 6/2000 |
| EP | 1077238 | 2/2001 |
| EP | 1088865 | 4/2001 |
| JP | 10279870 | * 10/1998 |
| WO | WO 9923183 | 5/1999 |

* cited by examiner

*Primary Examiner*—Callie Shosho
(74) *Attorney, Agent, or Firm*—Dinsmore & Shohl LLP; John A. Brady

(57) ABSTRACT

The present invention relates to ink compositions. More particularly, the present invention relates to ink compositions comprising a colorant and a polymeric binder having a below ambient glass transition temperature, an average particle diameter above about 200 nm and an acid component ranging from about 1% to about 10% by weight of the polymeric binder. Additionally, the present invention has the novel and useful feature of resistance to both wet-rub and dry smear as well as increased highlighter resistance and decreased occurrences of maintenance problems such as clogging and kogation.

28 Claims, No Drawings

INK COMPOSITIONS

TECHNICAL FIELD

This invention relates to the field of ink compositions for ink jet printers.

BACKGROUND ART

The present invention relates to ink compositions for ink jet printers. More particularly, the present invention relates to ink compositions comprising a colorant and a polymeric binder.

Ink jet printing is a conventional technique by which printing is normally accomplished without contact between the printing apparatus and the substrate, or medium, on which the desired print characters are deposited. Such printing is accomplished by ejecting ink from the ink jet printhead of the printing apparatus via numerous methods which employ, for example, pressurized nozzles, electrostatic fields, piezo-electric elements and/or heaters for vapor phase bubble formation.

The ink compositions used in ink jet printing typically employ an aqueous carrier, usually water, colorants and low molecular weight water miscible materials. The colorants which may be employed include dyes and pigments. Pigments provide improved properties such as improved print quality, lightfastness and waterfastness. Unlike dyes, which penetrate into the substrate along with the other components of the ink, pigments tend to sit on top of the substrate. As a result of the physical properties of pigments, pigment based ink compositions have a tendency to dry smear, have low resistance to wet-rub and have low highlighter resistance. The term "dry smear," as used herein, means applying abrasive pressure across the printed substrate and measuring any smear created thereby. The term "wet-rub," as used herein, means applying a drop of water to the printed substrate followed by applying abrasive pressure across the printed substrate using a cloth and measuring the optical density of the residual ink which lifts from the substrate onto the cloth; wet-rub differs from waterfastness because abrasion is used. The term "highlighter resistance," as used herein, means applying abrasive pressure across the printed substrate with a commercially available highlighting marker and measuring any smear created thereby; an example of such marker is Sanford Corp. MAJOR ACCENT brand highlighting markers. To solve this problem, the present invention was developed to provide an ink composition comprising a colorant and a polymeric binder that improves the resistance of the printed ink to dry smear and wet-rub and provides better highlighter resistance when the ink is jetted onto the substrate. The present invention has demonstrated the ability to resist smearing upon dry smear and wet-rub as well as increased highlighter resistance.

Polymers have been added to ink jet ink compositions to improve durability, to improve print quality and to reduce color bleeding and feathering. However, the inclusion of polymers has resulted in increased printhead maintenance problems, including clogging of the nozzles and kogation, i.e. formation of film on or about the heater. Also, polymers may tend to form films on the nozzle plate. The addition of polymers to ink compositions also may cause decreased pigment dispersion stability and interference with bubble formation. Existing inventions have attempted to address the problems, such as kogation, clogging and other malfunctioning of the printhead, that result from the incorporation of polymers into ink compositions.

U.S. Pat. No. 5,814,685 to Satake, et al. (hereinafter referred to as "Satake") discloses an ink composition in which pigment and a resin are dispersed in an aqueous medium. Satake further teaches that the resin is a polymeric core/shell material with a glass transition temperature (Tg) of the core in the range of from −100° C. to 40° C., and a Tg of the shell in the range from 50° C. to 150° C., and an average particle size of 20 to 200 nm. Satake teaches that particle size greater than 200 nm causes increased maintenance problems.

U.S. Pat. No. 6,063,834; filed Dec. 8, 1997 to Kappele, et al. and assigned to Lexmark International, Inc. (hereinafter referred to as "Kappele") discloses wet-rub resistant ink compositions. Kappele teaches an ink composition utilizing specific copolymers and/or terpolymers as binders, which encapsulate or cover the colorants and form a film on the substrate when the ink is jetted.

U.S. Pat. No. 5,679,724 to Sacripante, et al. (hereinafter referred to as "Sacripante") discloses an ink for ink jet printing including a pigment and an emulsifiable polymer resin. Further, Sacripante discloses a Tg range of 10° C.–100° C., preferably 35° C.–80° C. Sacripante teaches that if the Tg is too low, the print media becomes sticky.

European Patent Application No. 851 010 of inventor Anton, et al. (hereinafter referred to as "Anton") discloses an ink composition utilizing a core/shell emulsion polymer with a pigment as the colorant. Further, Anton teaches adding core/shell emulsion polymers to inks containing insoluble colorants in effective quantities to improve waterfastness. Anton illustrates a core/shell emulsion polymer containing two distinct phases having different Tg, i.e. one phase has a Tg above ambient temperature and the other phase has a Tg below ambient temperature.

European Patent Application No. 704 303 of inventors Fujisawa, et al. (hereinafter referred to as "Fujisawa") discloses an ink composition comprising a colorant, a thermoplastic resin and water. Fujisawa teaches that the thermoplastic resin has a Tg of 50 °–150° C. Fujisawa further teaches that the particle diameter of the thermoplastic resin is less than 300 nm, preferably 50–200 nm.

European Patent Application No. 887 391 of inventors Kubota, et al. (hereinafter referred to as "Kubota") discloses an ink composition which comprises a colorant, an inorganic oxide colloid, an alkali metal hydroxide and an aqueous solvent. Kubota teaches including a resin emulsion having a particle size less than 150 nm, preferably 5–100 nm.

European Patent Application No. 869 160 A2 of inventors Nichols, et al. (hereinafter referred to as "Nichols") discloses an inkjet ink formulation with colorant, vehicle and resin emulsion containing ionic carboxylic groups on the surface of resin emulsion particles to cause disassociation of the colorant and resin particles. The resin of Nichols has 1 to 40 wt. % "carboxylic acid groups", and Tg of 0° C. to 120° C.; exemplified embodiments of the resin include copolymers of butyl acrylate, methyl methacrylate and (meth)acrylic acid, with 3 to 20 wt. % acid, Tg of 53° C. to 95° C. and particle size of 63 nm to 235 nm, utilizing high Tgs and low particle sizes. Nichols asserts that the inks have good water resistance, however the tests of Nichols only assessed passive water bleed, and did not assess the commercially critical wet-rub resistance or highlighter resistance.

As illustrated by Satake, Fujisawa and Kubota, prior research in this area teaches that smaller binder particles, generally less than about 200 nm average diameter, are preferred, presumably as a result of anticipating lowered maintenance problems such as clogging of the inkjet printhead nozzles. As illustrated by Sacripante and Fujisawa, prior research teaches that the apparent Tg of the binder should be significantly above ambient temperature (i.e., above about 25° C.) to avoid maintenance problems such as kogation.

As illustrated by Kappele and Anton, prior research teaches that resistance to wet-rub may be incorporated into inks by utilizing polymer resins or core/shell polymer emulsions.

As identified above, the challenge and problem presented by the prior art are to develop an inkjet ink binder which will remain dispersed in the complete inkjet ink formulation, will not clog the printhead nozzle or other aspects of the print mechanism, will form a film or other means to bind the pigment together and onto the surface of the paper or other print medium, and will provide a printed ink which is wet-rub, dry smear, scrub and highlighter resistant. The present invention solves all of these problems by use of a polymeric binder as described herein.

Contrary to accepted research and knowledge, the present invention provides for an ink composition comprising a colorant and a polymeric binder wherein the polymeric binder has an average particle diameter of greater than about 200 nm, a below ambient Tg of about −10° C. and an acid component content of about 1% to about 10% by weight of the binder. Unlike the prior inventions, the present invention provides improved resistance to dry smear, improved resistance to wet-rub, and improved highlighter resistance without creating the printhead maintenance problems of kogation and clogging.

SUMMARY OF THE INVENTION

The present invention is an aqueous ink. More specifically, this invention relates to inks comprising a colorant and a polymeric binder wherein the binder has suitable glass transition temperature ("Tg"), particle size, and charge such that there is no adverse interaction between the ink, the polymeric binder, and the printhead, and such that the resultant ink demonstrates acceptable maintenance, improved resistance to dry smear, improved resistance to wet-rub and highlighter resistance. The ink composition of the present invention includes a colorant and a polymeric binder with the extraordinary and unexpected properties of providing an ink jet ink composition which successfully adheres to the substrate without experiencing wet-rub or dry smear, with increased highlighter resistance and without causing increased printhead maintenance problems due to clogging, kogating and other malfunctioning of the nozzles.

An ink composition utilizing a polymeric binder with a below ambient Tg is an object of this invention. A polymeric binder with a below ambient Tg removes the requirement that the ink composition be heated to activate the polymer binder after jetting. Typically, a polymeric binder with a below ambient Tg generally causes increased maintenance problems such as kogation and clogging, and further, generally such inks including such a polymeric binder do not jet.

These and other objectives of the present invention will become apparent from a description of the preferred embodiments herein, and from the claims, which will further define the scope of this invention.

DESCRIPTION OF THE PREFERRED EMBODIMENTS

The ink composition according to the present invention contains a colorant, a polymeric binder, and an aqueous carrier. Each of these required components, as well as some optional components, is described in detail below.

The colorant of the present invention may be a dye or a pigment, and preferably is a pigment. Preferably the colorant is a water insoluble pigment. The colorant may be a self-dispersed pigment, a pigment mixed with a dispersant, or a combination of these. There is essentially no limitation with respect to the colorants which may be utilized in preparing the ink compositions of the present invention. In one embodiment, the colorant is present at from about 0.5% to about 7% by weight of the final ink composition, in another embodiment, the colorant is present at from about 1% to about 5% by weight of the final ink composition, and in yet another embodiment, the colorant is present at from about 2% to about 4% by weight of the final ink composition.

There is no limitation with respect to the pigments that may be employed in this invention other than that they are capable of resulting in an ink. Any of the commonly employed organic or inorganic pigments may be used. An illustrative example of the pigments which may be employed in this invention includes azo pigments such as condensed and chelate azo pigments; polycyclic pigments such as phthalocyanines, anthraquinones, quinacridones, thioindigoids, isoindolinones, quinophthalones. Still other pigments which may be employed include, for example, nitro pigments, daylight fluorescent pigments, carbonates, chromates, titanium oxides, zinc oxides, iron oxides and carbon black. Such pigments may be prepared via conventional techniques and many are commercially available.

The pigment particle size ranges from about 10 nm to about 250 nm, and in one embodiment, it is about 130 nm. There are many art recognized techniques to prepare pigment for inks including preparation of self-dispersed pigment and preparation of pigment-dispersant mixtures. A process for preparing pigment dispersions used in inks is disclosed in U.S. Pat. No. 5,891,231 to Gnerlich, et al. and assigned to Lexmark International, Inc., which disclosure is incorporated by reference herein. Examples of pigments which may be used in the present invention are carbon black, such as Monarch 700, Monarch 880, Monarch 800, Regal 250R, Mogul L (from Cabot Corporation), FW18, FW200, Special Black 4A, Printer 95 (from Degussa Corporation), Raven 3500, Raven 1170 and Raven 2500 (from Columbian Chemicals Company); yellow pigment, such as pigment yellow 74 and pigment yellow 13 (from Sun Chemical Corporation), pigment yellow 138 (from Toyo Manufacturing); cyan pigment, such as pigment blue 15:3 (from Sun Chemical Corporation) and pigment blue 15:3 (from Toyo Manufacturing); and magenta pigment, such as pigment red 122, pigment red 57 and pigment red 81 (from Sun Chemical Corporation), pigment red 122 (from Toyo Manufacturing). Such examples are not meant to be limiting, and, as is art recognized, other sources and grades of carbon black, yellow pigment, cyan pigment and magenta pigment may be utilized in the present invention.

The polymeric binder of the present invention comprises a polymer or copolymer formed from monomer classes, including, but not limited to: acrylate esters, methacrylate esters, styrenes, substituted styrenes, vinyl acrylates, vinyl acetates, fluoromethacrylates, acrylamides, substituted acrylamides, methacrylamies, substituted methacrylamides, and combinations thereof. Among the esters of acrylic acid and methacrylic acid, preferred monomers include methyl acrylate, ethyl acrylate, propyl acrylate, butyl acrylate, lauryl acrylate, methyl methacrylate, ethyl methacrylate, propyl methacrylate, butyl methacrylate, lauryl methacrylate, and isobutylene methacrylate. Reference is made to contemporaneously filed U.S. Provisional Patent Application Serial No. 60/170,608, filed Dec. 14, 1999, titled "Polymeric Binder for Water-Resistant Ink Jet Inks," by Freeman, et al., assigned to Rohm and Haas Company, which application is incorporated by reference herein. In one embodiment, the binder comprises copolymer of butyl acrylate and methyl methacrylate. In a more specific embodiment, the polymeric binder comprises a co-polymer ranging from about 20% to about 40% by weight of methyl methacrylate and about 60% to about 80% by weight of butyl acrylate. The polymeric binder may comprise a copolymer ranging from about 27% to about 33% by weight of methyl methacrylate and about 66% to 72% by weight of butyl acrylate. In another embodiment, the polymeric binder comprises 10% to 50% by weight methyl methacrylate, 50% to 85% by weight butyl acrylate, and 3% to 10% by weight methacrylic acid, based on the total weight of the polymeric binder; for example 14.5% by weight methyl methacrylate, 80.5% by weight butyl acrylate, and 5% by weight methacrylic acid. The foregoing merely represent example of suitable polymeric binder compositions. The polymeric binders of the invention comprise polymer or copolymers with from 1 to 10% by weight acid component, based on the total weight of the polymeric binder. In the examples of ink compositions below, the polymeric binder is present at about 0.5% and at about 3% by weight of the ink composition. It should be noted, however, that the present invention includes ink compositions where the polymeric binder may be present at from about 0.1% to about 10% by weight of the ink composition.

The polymeric binder further comprises an acid component. The acid component may comprise acrylic acid, methacrylic acid, itaconic acid, vinyl sulfonic acid, maleic acids or combinations thereof, or may be derived from salts or anhydrides of such acids, such as methacrylic or maleic anhydride or sodium vinylsulfonate or acrylomidopropane sulfonate. In one embodiment the acid component is methacrylic acid. In another embodiment, the acid component is methacrylic acid in combination with another acid. The acid component of the polymeric binder ranges from about 1% to about 10% by weight of the total weight of the polymeric binder. In one embodiment, when the acid component is methacrylic acid, the acid component is about 1.1% to about 1.5% by weight of the total weight of the polymeric binder. In another embodiment, when the acid component is methacrylic acid, the acid component is about 1.3% by weight of the total weight of the polymeric binder. It should be noted, however, that the examples of ink compositions shown below do not represent the only possible formulations encompassed by the present invention, and that the present invention includes ink compositions when the acid component of the polymeric binder ranges from about 1% to about 10% by weight of the total weight of the polymeric binder.

The optimal Tg range of the polymeric binder is from about –20° C. to about 70° C. In one embodiment, the optimal preferable Tg range is from about –12° C. to about 25° C. Contrary to art expectations in below ambient temperatures (i.e., below about 25° C.), the polymeric binder of the present invention is suitable for use in conventional (i.e., thermal or piezoelectric) ink jet printers and color ink jet printers, for example the Lexmark 7000, Lexmark 5700, Lexmark Z51 and Lexmark 2050 printers. The Tg of the polymeric binder may range from about –10° C. to about 25° C., or from about –10° C. to about 0° C. In one embodiment, the polymeric binder has a Tg of about –10° C. At these glass transition temperatures, the binder is believed to form an adhesive film, continuous or otherwise, between the colorant and the substrate as the aqueous ink medium dissipates by evaporation, absorption by the substrate or otherwise. When the adhesive polymer is not continuous so as to constitute a true film, the adhesive effect may be achieved through "spot welds" in which sufficient polymer is present to adhere one or more colorant particles to the substrate.

The polymer particles comprising the polymeric binder have an average diameter in the range from about 250 nm to about 400 nm; preferably about 275 nm to 350 nm. Contrary to the general principle that smaller polymer particles, especially particles with average diameter less than 200 nm are less likely to cause printhead maintenance problems, the polymeric binder of the present invention with an average particle diameter ranging from about 275 nm to about 400 nm provided better overall printability than binders with larger or smaller particle sizes.

The particle size distribution of the polymeric binder may be unimodal, bimodal or polymodal, provided that the particle size distribution of the polymeric binder particles is such that essentially all the particles fall in the range from 130 to 450 nm in diameter. In one embodiment of the invention, the polymeric binder has a bimodal particle size distribution where, preferably, the small size particles have an average diameter in the range from 175 to 260 nm, and the large size particles have an average diameter in the range from 260 to 400 nm, and the average particle size is within the range from about 250 to 400 nm. In another embodiment of the invention, the polymeric binder has a unimodal particle size distribution with an average diameter in the range from 250 to 400 nm. In a preferable embodiment, the polymeric binder has a unimodal particle size distribution with an average diameter in the range from 275 to 350 nm, more preferably 275 to 300 nm; and a particle size distribution such that essentially all the particles fall in the range from 130 to 450 nm. The average particle size and particle size distribution may be determined by the capillary hydrodynamic fractionation (CHDF) technique.

The molecular weight of the polymeric binder is not critical. However, it has been found that the polymeric binder preferably has a molecular weight in the range from about 10,000 to about 2,000,000 Daltons (Da); more preferably, 50,000 to 1,000,000 Da. The molecular weight, as used herein, is defined as the weight average molecular weight and may be determined by gel permeation chromatography in tetrahydrofuran as solvent. The polymeric binder of the present invention may further comprise additional components which do not substantially alter the characteristics described above, including without limitation process aids such as surfactants, protective colloids, and other stabilizers known to those skilled in the art. Suitable surfactants, for example, include sodium lauryl sulfate, sodium dodecylbenzene sulfonate, sodium dioctyl sulfosuccinate, and ammonium perfluroralkyl sulfonates, Triton X-100, Triton X-405, and polyoxyethylenated polyoxypropylene glycols.

The polymeric binder may be prepared by a conventional persulfate-initiated thermal process known in the art such as batch, semi-batch, gradual addition or continuous. The monomers are polymerized to preferably greater than 99% conversion and then the reaction is cooled to room temperature (20–25° C.) after the addition of the appropriate amount of neutralizing base to control pH. The pH is adjusted to between pH 7–10, more preferably between pH 8–9; with neutralizer such as, for example, ammonia, sodium hydroxide, potassium hydroxide or combinations of these neutralizers. Preferably, potassium hydroxide is used as neutralizer. The preparation process used has been found to make it well suited to the preparation of the polymeric binders of the present invention. It allows for controlled particle size and particle size distribution at the desired acid level range, and a suitable Tg for the resulting polymeric binder.

The polymeric binder may be illustrated, in certain embodiments, through the following examples:

EXAMPLE 1

A sample of binder of the general composition ethyl acrylate (EA), styrene (STY), and methacrylic acid (MAA) was prepared as follows. After heating a reaction vessel containing 400 ml deionized, buffered water (0.06 mmol buffer/gm of water) and 2.1 g sodium lauryl sulfate (SLS) to 88° C., 4% of a mixture of 488 g water, 6 g SLS, 714 g EA, 234 g STY and 12.2 MAA was added with 2.7 g sodium persulfate (NaPS) in 12 g of water. This combination was held at 88° C. for 10 minutes. Then, the remaining monomer mix was added over a period of 180 minutes, with a cofeed of 1.0 g sodium persulfate in 50 ml water at a rate such that the addition period was 185 minutes.

After the cofeed addition was completed, the vessel was held at 88° C. for 30 minutes and then cooled. The product was then filtered through 100 and 325 mesh screens. The filtered product was neutralized by combining 865 g of unneutralized product with 735.2 g deionized water and neutralized to pH 8.5 with 10% potassium hydroxide. The average particle size was 280 nm with a particle size distribution ranging from 175 nm to 400 nm. The calculated Tg was approximately 13° C.

EXAMPLE 2

A sample of butyl acrylate (BA), methyl methacrylate (MMA), and MAA polymer was prepared according to the procedure in Example 1 except that the monomer mixture consisted of 28.1 g MAA, 663.1 g MMA, 1468.8 g BA and 10.5 g SLS. In this case, a reaction vessel containing 1130 g deionized, buffered water (0.06 mmol buffer/g water) and 4.0 g SLS was heated to 81° C. Then 115.0 g of the monomer mix with a 20 g water rinse was added to the vessel followed by 5.6 g NaPS dissolved in 25 g of water. This combination was held at 81° C. for 10 minutes and then the remaining monomer mixture was added over 180 minutes along with an additional 16.5 g SLS and a co-feed of 2.2 g NaPS in 100 g of water (added over 185 minutes). After the co-feed was completed, the reaction was held at 81° C. for 30 minutes. Then the product was cooled, filtered and neutralized with the neutralization accomplished by combining 1760 g of unneutralized product with 1470 g deionized water and brought to a pH of 8.5 with KOH. The resultant polymer had an average particle sized of 286 nm with a particle size distribution ranging from 174 nm to 408 nm. The calculated Tg was 0° C.

EXAMPLE 3

A sample of butyl acrylate (BA), methyl methacrylate (MMA), and acrylic acid (AA) polymer was prepared according to the procedure in Example 2 except that the monomer mixture consisted of 23.5 g AA, 667.7 g MMA, 1468.8 g BA and 10.5 g SLS. In this case, a reaction vessel containing 1130 g deionized, buffered water and 3.0 g SLS was heated to 81° C. The remaining monomer mix, NaPS, as well as an additional 17.5 g of SLS were fed to the vessel after the initial addition of the mixture. Following neutralization, the resultant polymer had an average particle size of 348 nm with a particle size distribution ranging from 231 nm to 480 nm. The calculated Tg of this polymer was 0° C.

EXAMPLE 4

A sample of butyl acrylate (BA), methyl methacrylate (MMA), and methacrylic acid (MAA) polymer was prepared according to the procedure in Example 2 with the same monomer mixture which consisted of 28.1 g MAA, 663.1 g MMA, 1468.8 g BA and 10.5 g SLS. In this case, a reaction vessel containing 1130 g deionized, buffered water and 3.0 g SLS was heated to 81° C. The remaining monomer mix NaPS, as well as an additional 17.5 g of SLS were fed to the vessel after the initial addition of the mixture. Following neutralization, the resultant polymer had an average particle size of 301 nm with a particle size distribution ranging from 184 nm to 430 nm. The calculated Tg of this polymer was 0° C. In an assessment of printability, a sample ink containing 3.0% by weight of the polymer was used to print 90 pages on a Lexmark desktop printer. On the 90$^{th}$ page of this print test which was repeated three time, an average of 22 nozzles in the ink cartridge had misfired.

EXAMPLE 5

A sample of butyl acrylate (BA), methyl methacrylate (MMA), and methacrylic acid (MAA) polymer was prepared according to the procedure in Example 2 with the same monomer mixture which consisted of 28.21 g MAA, 663.1 g, 1468.8 g BA and 10.5 g SLS. In this case, a reaction vessel containing 1130 g deionized, buffered water and 5.0 g SLS was heated to 81° C. The remaining monomer mix, NaPS, as well as an additional 15.5 g of SLS were fed to the vessel after the initial addition of the mixture. Following neutralization, the resultant polymer had an average particle size of 254 nm with a particle size distribution ranging from 165 nm to 341 nm. The calculated Tg of this polymer was

EXAMPLE 6

A sample of butyl acrylate (BA), methyl methacrylate (MMA), and methacrylic acid (MAA) polymer was prepared according to the procedure in Example 2 with a monomer mixture which consisted of 43.2 g MAA, 648.0 g MMA, 1468.8 g BA and 10.5 g SLS. In this case, a reaction vessel containing 1130 g deionized, buffered water and 5.0 g SLS was heated to 81° C. The remaining monomer mix, NaPS, as well as an additional 15.5 g of SLS were fed to the vessel after the initial addition of the mixture. Following neutralization, the resultant polymer had an average particle size of 238 nm with a particle size distribution ranging from 133 nm to 340 nm. The calculated Tg of this polymer was 0° C.

The aqueous carrier of the present invention is water (preferably deionized water). The aqueous carrier is present at from about 40% to about 95%, may be present at from about 55% to about 80%, and may be present at from about 70% to about 80% by weight of the ink composition. Selection of a suitable mixture for the ink composition of the present invention depends upon the requirements of the specific ink being formulated, such as the desired surface tension and viscosity, the pigment used, the drying time required for the pigmented ink and the type of paper onto which the ink will be printed.

The ink composition of the present invention may also include water miscible materials such as humectants, dispersants, penetrants, chelating agents, buffers, biocides, fungicides, bacteriocides, surfactants, anti-curling agents, anti-bleed agents and surface tension modifiers, all as is known in the art. The addition of such materials is generally dictated by the requirements of the specific ink and is used to modify properties of the ink such as surface tensions and viscosity.

The amount of humectant used is determined by the desired properties of the ink and may range from about 1% to about 30% by weight of the ink composition. Useful humectants include ethylene glycol, 1,3 propanediol, 1,4 butanediol, 1,4 cyclohexanedimethanol, 1,5 pentanediol, 1,6 hexanediol, 1,8 octanediol, 1,2 propanediol, 1,2 butanediol, 1,3 butanediol, 2,3 butanediol, diethylene glycol, triethylene glycol, tetraethylene glycol, polyethylene glycol with average molecular weight of 200, 300, 400, 600, 900, 1000, 1500 and 2000, dipropylene glycol, polyproylene glycol with average molecular weight of 425, 725, 1000, and 2000, 2-pyrrolidone, 1-methyl-2-pyrrolidone, 1-methyl-2-piperidone, N-ethylacetamide, N-methlpropionamide, N-acetyl ethanolamine, N-methylacetamide, formamide, 3-amino-1, 2-propanediol, 2,2-thiodiethanol, 3,3-thiodipropanol, tetramethylene sulfone, butadiene sulfone, ethylene carbonate, butyrolacetone, tetrahydrofurfuryl alcohol, glycerol, 1,2,4-butenetriol, trimethylpropane, sorbital, pantothenol, Liponic EG-1. Preferred humectants are polyethylene glycol with average molecular weight of 400 to 1000, 2-pyrrolidone, 2,2 thiodiethanol, 1,5 pentanediol, and 1,2 propanediol.

The amount of penetrant used is determined by the desired properties of the ink and may range from about 0.01% to about 10% by weight of the ink composition. Useful penetrants are 1,2 alkyl diols of from 4 to 10 carbon atoms forming the alkyl such as 1,2-hexanediol and others as more fully disclosed in U.S. Pat. No. 5,364,461 to Beach, et al. and assigned to Lexmark International, Inc., which disclosure is incorporated by reference herein. Useful penetrants include N-propanol, isopropyl alcohol, 1,2 hexanediol, and hexyl carbitol.

The amount of dispersant used is determined by the properties of the colorant when the colorant is a pigment. Useful dispersants are graft copolymers compromising a hydrophilic polymeric segment, a hydrophobic polymeric segment incorporating a hydrolytically-stable siloxyl substituent, and a stabilizing segment. A preferred dispersant is the terpolymer dispersant disclosed in U.S. Pat. Nos. 5,714,538 and 5,719,204 to Beach, et al. and assigned to Lexmark International, Inc., which disclosures are incorporated by reference herein. For the purposes of this invention, the dispersant composition is not critical as long as its use results in a stable and printable ink.

The ink composition of the present invention may be prepared by any method known in the art for making such compositions, for example, by mixing, stirring or agitating the ingredients together using any art recognized technique to form an aqueous ink. The procedure for preparation of the ink composition of the present invention is not critical except to the extent that the ink composition is homogenous.

It is expected that the ink composition of the present invention would include any additives necessary to obtain the desired physical properties required for the end use of the ink composition such additives include chelating agents, buffers, biocides, fungicides, bacteriocides, surfactants, anti-curling agents, anti-bleed agents and surface tension modifiers, all as discussed above. Examples of ink composition include the following formulations:

Ink Composition 1
  4% colorant (mixture of self-dispersed carbon black pigment and mixture of carbon black pigment and dispersant)
  0.5% polymeric binder (Tg −10° C., particle size 285 nm, 1.3% acid component)
  15% humectant (7.5% polyethylene glycol 400 and 7.5% 2-pyrrolidone)
  0.75% terpolymer dispersant
  0.75% penetrant (hexyl carbitol)
  balance deionized water Ink Composition 2
  4.8% colorant (mixture of carbon black pigment and dispersant)
  3% polymeric binder (Tg −10° C., particle size 285 nm, 1.3% acid component)
  15% humectant (5% polyethylene glycol 1000, 5% 2,2-thiodiethanol and 5% 2-pyrrolidone)
  1% penetrant (1,2-hexanediol)
  balance deionized water Ink Composition 3
  2.25% colorant mixture of (Toyo cyan pigment and dispersant)
  3% polymeric binder (Tg −10° C., particle size 285 nm, 1.3% acid component)
  20% humectant (10% polyethylene glycol 400 and 10% 2,2-thiodiethanol)
  1% penetrant (1,2-hexanediol)
  balance deionized water Comparative Ink Composition A
  4.8% colorant (mixture of carbon black pigment and dispersant)
  20% humectant (10% polyethylene glycol 400 and 10% 2,2 thiodiethanol)
  2% penetrant (N-propanol)
  balance deionized water Comparative Ink Composition B
  2.25% colorant (mixture of Toyo cyan pigment and dispersant)
  20% humectant (10% polyethylene glycol 400 and 10% 2,2-thiodiethanol)
  1% penetrant (1,2-hexanediol)
  balance deionized water The resistance of Ink Compositions 1, 2, and A to wet rub was determined by using a commercially available densitometer to measure the optical density of the residual ink on a wet cloth that was rubbed over the printed substrate. The results are shown in Chart 1.

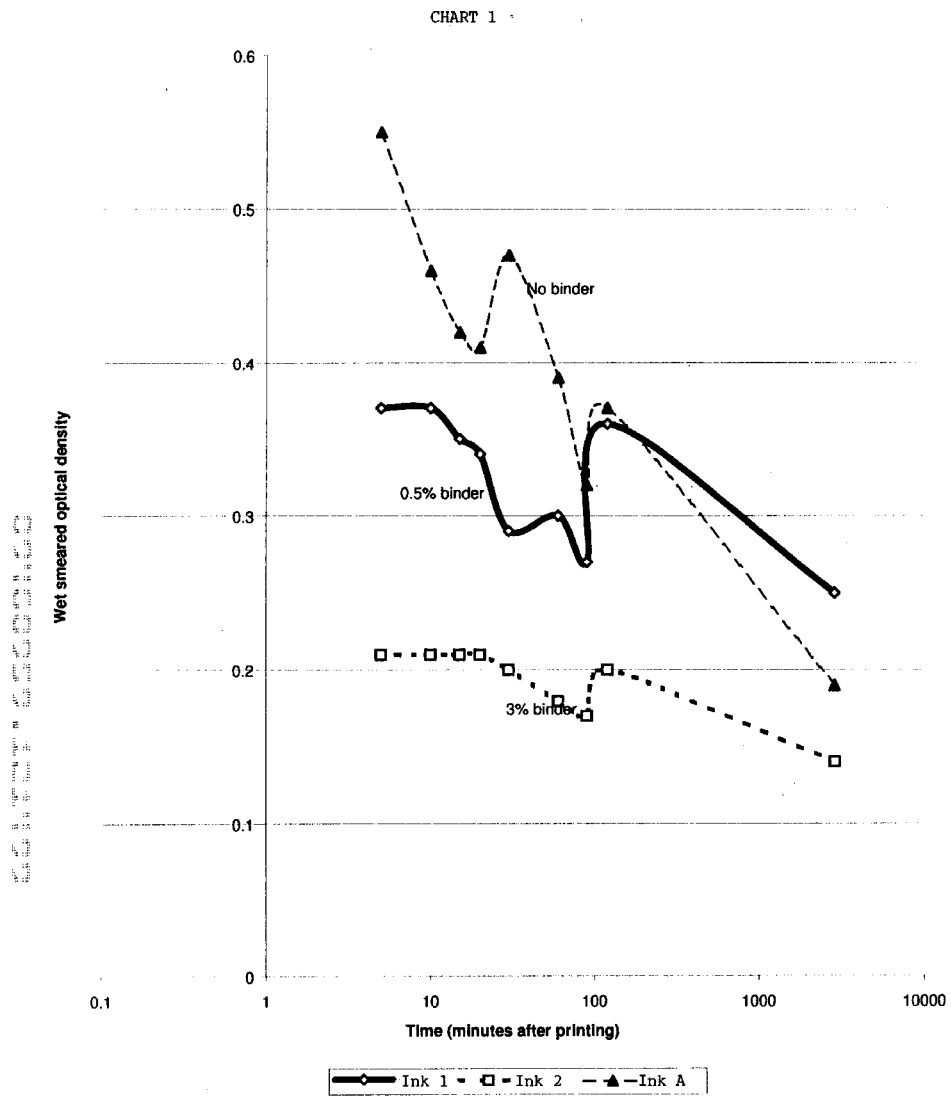

The resistance of Ink Compositions 1, 2, 3, A and B to highlighter smear was determined by using a commercially available densitometer to measure the optical density of the trailing edge of a highlighter mark after passing over the printed substrate into an unprinted area of the substrate. The results are shown in Chart 2.

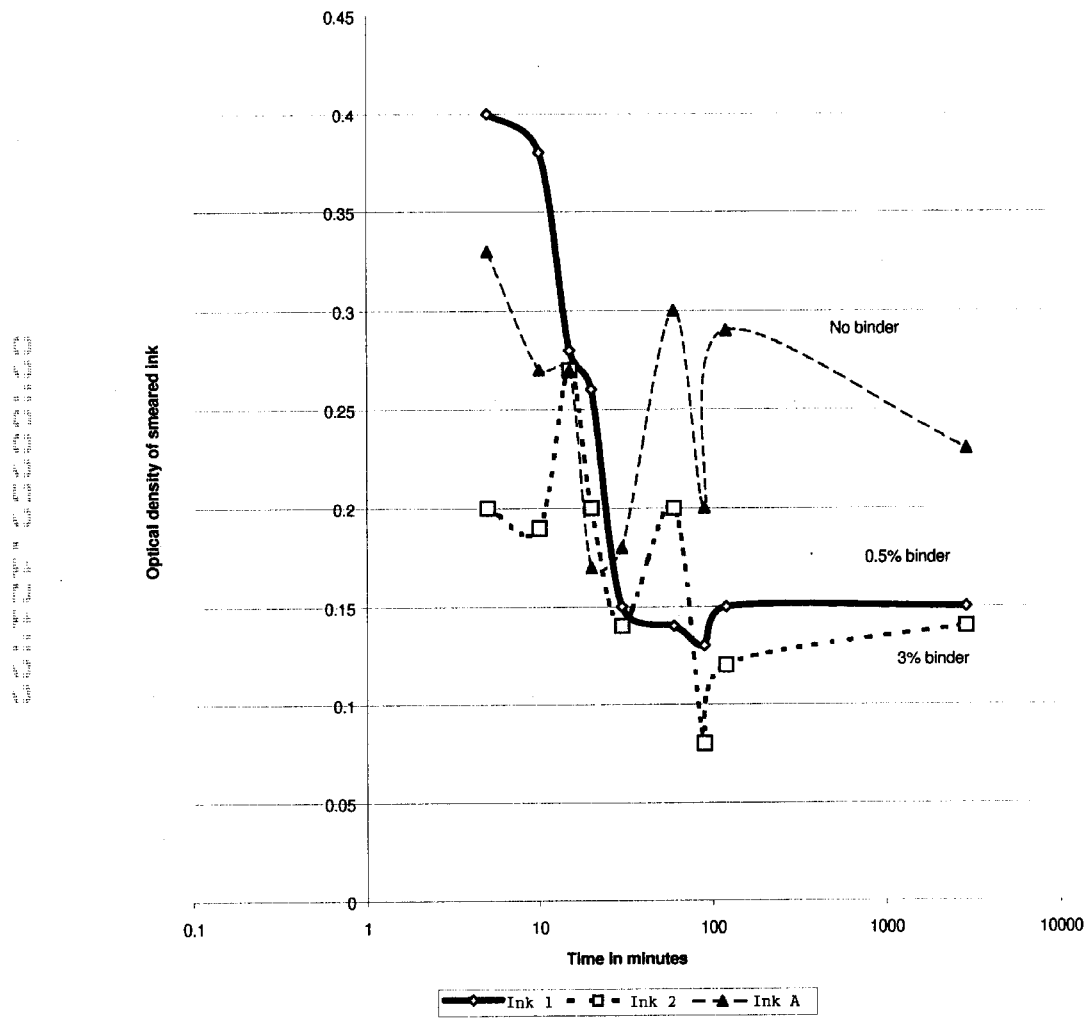

Dry smear, water fastness and highlighter resistance were measured to determine how long each ink composition took to reach an acceptable result (i.e. no change in optical density after smear/rub). The results are shown in Table 1.

TABLE 1

| Test | Ink Composition (time in minutes) | | | | |
|---|---|---|---|---|---|
| | 1 | 2 | A | 3 | B |
| DrySmear | 10 | 10 | 10 | 10 | 10 |
| Water Fastness | 30 | 10 | 30 | 10 | 10 |
| Highlighter Resistance | 180 | 30 | 1440 | 10 | 60 |

Although the exact reasons are not known, it is theorized that the polymeric binder particles flow together at a given temperature (generally a temperature above the Tg) binding the pigment particles together to form a film, successfully adhering the pigment particles together and to the substrate. It is believed that the polymeric binder encapsulates the pigment particles in the ink composition. It is further believed that, when jetted, the polymeric binder forms a film on the substrate, holding the pigment particles in place, and adhering the pigment particles to the substrate. The polymeric binder of the present invention with a below ambient Tg forms a good film at room temperature on a wide range of substrates with little or no dry smear, little or no or wet rub and highlighter resistance.

It is also theorized that the larger particle size of the polymeric binder results in fewer particles per milliliter of ink; therefore, there are fewer instances of particles interacting with each other and with the printhead apparatus (eg. nozzle openings, nozzle channels, ink channels, etc.).

What is claimed is:

1. An ink comprising:
   a. an aqueous carrier;
   b. a colorant; and
   c. a polymeric binder having a glass transition temperature ranging from about −20° C. to 10° C., an average particle diameter ranging from 250 nm to about 400 nm and an acid component ranging from about 1% to about 10% by weight of said binder.

2. The ink of claim 1 wherein said class transition temperature of said binder ranges from about −12° C. to about 0° C., said average particle diameter of said binder ranges from 250 nm to about 350 nm and said acid component of said binder ranges from about 1% to about 3% by weight of said binder.

3. The ink of claim 2 wherein said colorant is one or more of a pigment-dispersant mixture and a self-dispersed pigment.

4. The ink of claim 3 wherein said colorant ranges from about 0.5% to about 7% by weight of said ink and said binder ranges from about 0.1% to about 10% by weight of said ink.

5. The ink of claim 4 wherein said colorant is said self-dispersed pigment and said pigment-dispersant mixture, wherein said colorant ranges from about 1% to about 5% by weight of said ink and said binder is about 0.5% by weight of said ink.

6. The ink of claim 4 wherein said colorant is said pigment-dispersant mixture, wherein said colorant ranges from about 1% to about 5% by weight of said ink and said binder is about 3% by weight of said ink.

7. The ink of claim 1 wherein said glass transition temperature of said binder ranges from about −12° C. to about 0° C., said average particle diameter of said binder ranges from 250 nm to about 350 nm and said acid component of said binder is about 1.3%.

8. The ink of claim 7 wherein said colorant is one or more of a pigment-dispersant mixture and a self-dispersed pigment.

9. The ink of claim 8 wherein said colorant ranges from about 0.5% to about 7% by weight of said ink and said binder ranges from about 0.1% to about 10% by weight of said ink.

10. The ink of claim 9 wherein said colorant is said self-dispersed pigment and said pigment-dispersant mixture and wherein said colorant ranges from about 1% to about 5% by weight of said ink and said binder is about 0.5% by weight of said ink.

11. The ink of claim 9 wherein said colorant is said pigment-dispersant mixture and wherein said colorant ranges from about 1% to about 5% by weight of said ink and said binder is about 3% by weight of said ink.

12. The ink of claim 1 wherein said glass transition temperature of said binder ranges from about −12° C. to about 0° C., said average particle diameter of said binder ranges from 250 nm to about 350 nm and said acid component of said binder ranges from about 4% to about 10% by weight of said binder.

13. The ink of claim 12 wherein said colorant is one or more of a pigment-dispersant mixture and a self-dispersed pigment.

14. The ink of claim 13 wherein said colorant ranges from about 0.5% to about 7% by weight of said ink and said binder ranges from about 0.1% to about 10% by weight of said ink.

15. The ink of claim 14 wherein said colorant is said self-dispersed pigment, wherein said colorant ranges from about 1% to about 5% by weight of said ink wherein said binder ranges from about 0.5% to about 3% by weight of said ink.

16. The ink of claim 1, wherein said binder further comprises a mixture of a plurality of larger particles and a plurality of smaller particles, and further wherein said binder mixture is bimodal.

17. An ink comprising:
   a. an aqueous carrier;
   b. a colorant; and
   c. a polymeric binder consisting essentially of one or more monomers selected from the group consisting of acrylates, methacrylates, substituted styrenes, styrenes, fluoromethacrylates, vinyl acrylates, vinyl acetates, acrylamides, substituted acrylamides, methacrylamides and substituted methacrylamides and an acid component selected from the group consisting of acrylic acid, methacrylic acid, itaconic acid, maleic acids, vinylsulfonic acids and acids derived from methacrylic anhydride, maleic anhydride, sodium vinylsulfonate or acryloamido propane sulfonate, or combinations thereof, wherein said acid component is present from about 1% to about 3% by weight of said binder, wherein said binder having a glass transition temperature ranging from about −20° C. to 10° C. and an average particle diameter ranging from 250 nm to about 450 nm.

18. The ink of claim 17, wherein said monomers are selected from one or more of alkyl acrylates and alkyl methacrylates.

19. The ink of claim 18, wherein said monomers are selected from one or more of methyl acrylate, ethyl acrylate, propyl acrylate, butyl acrylate, methyl methacrylate, ethyl methacrylate, propyl methacrylate and butyl methacrylate.

20. The ink of claim 19, wherein said monomers are a combination of butyl acrylate and methyl methacrylate.

21. The ink of claim 20, wherein said binder comprises from about 66% to about 72% by weight butyl acrylate and 27% to about 33% weight methyl methacrylate.

22. The ink of claim 18, wherein said binder further comprises a mixture of a plurality of larger particles and a plurality of smaller particles, and further wherein said binder mixture is bimodal.

23. The ink of claim 17, wherein said acid component is selected from one or more of acrylic acid and methacrylic acid.

24. The ink of claim 17, wherein said glass transition temperature of said binder ranges from about −12° C. to 0° C., said average particle diameter ranges from 250 nm to about 350 nm and said acid component ranges from about 1.3% to about 2.5% by weight of said binder.

25. The ink of claim 24, wherein said colorant is one or more of a pigment-dispersant mixture and a self-dispersed pigment.

26. The ink of claim 25 wherein said colorant ranges from about 0.5% to about 7% by weight of said ink and said binder ranges from about 0.1% to about 10% by weight of said ink.

27. The ink of claim 26 wherein said colorant is said self-dispersed pigment and said pigment-dispersant mixture, wherein said colorant ranges from about 1% to about 5% by weight of said ink and said binder is about 0.5% by weight of ink.

28. The ink of claim 26 wherein said colorant is said pigment-dispersant mixture, wherein said colorant ranges from about 1% to about 5% by weight of said ink and wherein said binder is about 3% by weight of said ink.

* * * * *